United States Patent
Klein et al.

(10) Patent No.: US 6,626,473 B1
(45) Date of Patent: Sep. 30, 2003

(54) OUTER DOOR HANDLE, ESPECIALLY FOR MOTOR VEHICLES, WITH A BOW-TYPE HANDLE AND WITH A PRESSURE-ACTUATED ELEMENT INTEGRATED THEREIN

(75) Inventors: Helmut Klein, Velbert (DE); Ulrich Müller, Velbert (DE)

(73) Assignee: Huf Hülsbeck & Fürst GmbH & Co. KG, Velbert (DE)

(*) Notice: Subject to any disclaimer, the term of this patent is extended or adjusted under 35 U.S.C. 154(b) by 0 days.

(21) Appl. No.: 09/857,221

(22) PCT Filed: Oct. 23, 1999

(86) PCT No.: PCT/EP99/08044
§ 371 (c)(1),
(2), (4) Date: Jun. 1, 2001

(87) PCT Pub. No.: WO00/34604
PCT Pub. Date: Jun. 15, 2000

(30) Foreign Application Priority Data

Dec. 10, 1998 (DE) .......................................... 198 56 902

(51) Int. Cl.⁷ .............................................. E05B 1/00
(52) U.S. Cl. .............................. 292/347; 292/DIG. 37; 200/302.2
(58) Field of Search ................................. 292/347, 356, 292/348, DIG. 37; 74/471, 553, 554, 555, 558.5; 345/161, 156, 114; 200/329, 302.1–302.3

(56) References Cited

U.S. PATENT DOCUMENTS

| | | | | |
|---|---|---|---|---|
| 3,767,875 A | * | 10/1973 | Schneikart et al. | 200/302.1 |
| 3,917,917 A | * | 11/1975 | Murata | 200/292 |
| 3,932,722 A | * | 1/1976 | Obata et al. | 200/302.2 |
| 3,973,099 A | * | 8/1976 | Morris, Sr. | 200/302.2 |
| 4,376,238 A | * | 3/1983 | Martin | 200/1 B |
| 5,510,584 A | * | 4/1996 | Norris | 200/1 B |
| 6,313,826 B1 | * | 11/2001 | Schrum et al. | 200/5 A |
| 6,344,791 B1 | * | 2/2002 | Armstrong | 338/114 |

FOREIGN PATENT DOCUMENTS

| | | |
|---|---|---|
| DE | 1944225 | 8/1966 |
| DE | 4208087 | 4/1993 |
| FR | 1401167 | 4/1965 |
| FR | 2587833 | 3/1987 |

* cited by examiner

Primary Examiner—Gary Estremsky
Assistant Examiner—Mark Williams
(74) Attorney, Agent, or Firm—Friedrich Kueffner

(57) ABSTRACT

The invention relates to an outer door handle. According to the invention, the press element (15) integrated in the bow-type handle is configured as a multiple-component insert (20) with two components, namely a hard component (21) and a soft component (22). The multiple-component insert is shaped like a cap. The center portion (23) of the cap bottom consists of a plate-shaped hard component (21) on the exterior. The remaining area of the cap, namely especially the contour part (35) towards the plate and the cap coat exclusively consist of the soft component (22). The cap coat is inserted in a force fit in a recess (13) of the bow-type handle by way of contacting surfaces and shoulders (41) and is secured therein by snap-in elements (43).

8 Claims, 3 Drawing Sheets

Figure 1:
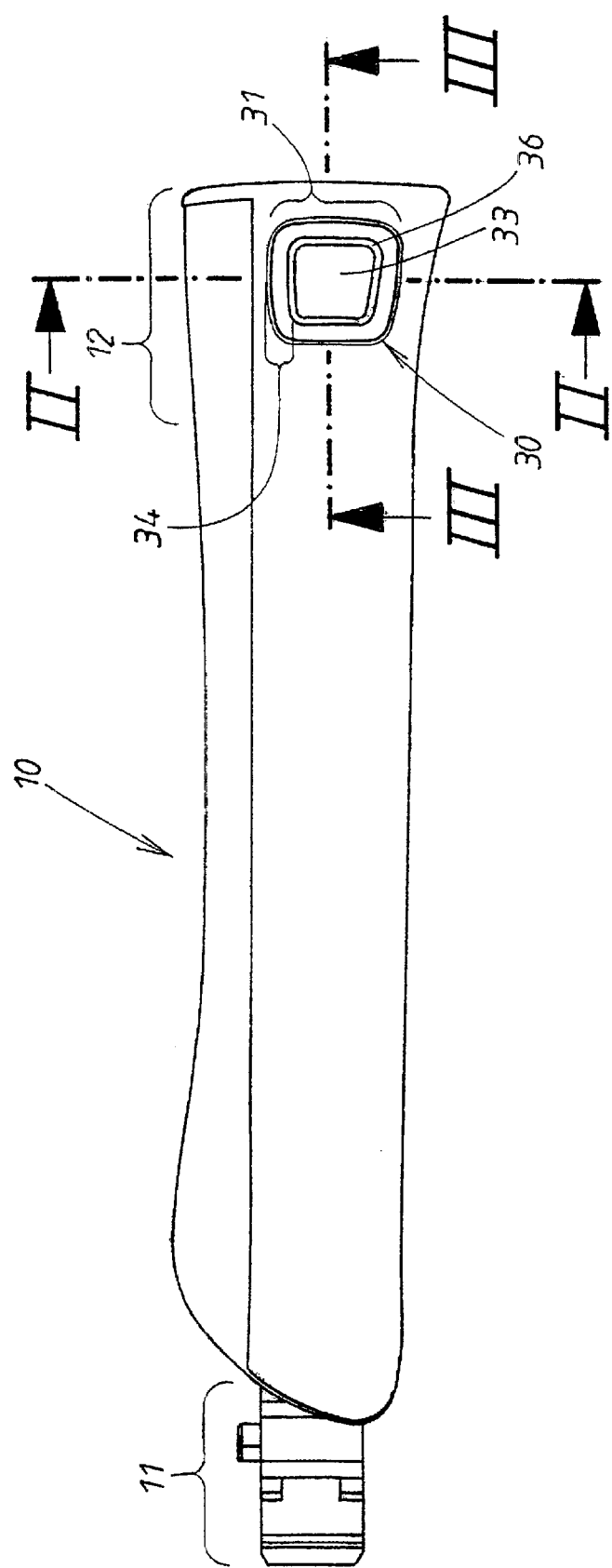

OUTER DOOR HANDLE, ESPECIALLY FOR MOTOR VEHICLES, WITH A BOW-TYPE HANDLE AND WITH A PRESSURE-ACTUATED ELEMENT INTEGRATED THEREIN

The invention relates to a door handle of the type defined in the preamble of claim 1. In the known door handle the pressure-actuated element is formed as a uniform plastic member in the form of a cap which is inserted into the recess at the end of the bow-type handle.

In a known door handle (DE 18 42 237 U), a cap-shaped push button is pressed outwardly by a pressure spring in a telescope-like way from a bore in the door handle, a pressure spring at the inner end face of the push button being responsible for this action. The mantle area of the push button is surrounded at its lower area with a plastic sleeve which improves the slide guiding of the push button and is supposed to prevent riffle formation on the push button.

It is also known (DE 19 44 225 U) to provide a seal of elastomeric material for the purpose of a telescope-like guiding of a push button in the area of a handle. This sealing material is fastened in a door recess by ring-shaped laminas. In this case, the axial movability of the push button is also realized by separate pressure springs which are supported on the inner push button end.

There are also push actuators in door handles whose restoring force is provided by the plastic material itself. Such caps with integrated restoring action are favorable with regard to manufacturing technology and assembly.

In the known handle, the push actuators is hard to move when it is desired to use a scratch-resistant, hard plastic material for making the cap. If a softer plastic material were to be used for making the push actuator, its pleasant appearance would disadvantageously change within a short period of time by scratches or bulges.

The invention has the object to develop a push actuator of the kind mentioned in the preamble of claim 1 which, even after extended use, maintains its pleasant appearance and its functionality but can still be easily actuated. This is achieved according to the invention by the measures defined in the claim which have the following special meaning.

The push actuator according to the invention is comprised of a combination insert which is comprised of two components which are different with respect to their material. One component, which in the following is referred to as the "hard component" is arranged at least in the central area of the outer cap.bottom and is comprised of a hard, scratch-resistant plastic material. On the other hand, the second component is formed of an essentially softer shape-elastic plastic material which forms the entire cap but in the area of the cap bottom extends only on the inner surface, below the hard component. This second component is therefore referred to in the following as "soft component". The push actuator can be manufactured easily and precisely of these two components in a two-step injection molding process. Because the soft component is arranged exclusively in the area of the cap mantle, a good push actuation possibility of the mounted combination insert is provided. The good elastic properties of the soft component are used in this context. The push button actuator is easily movable. The hard component, on the other hand, is arranged in the zone of the cap bottom where the push actuation is realized. It provides a reinforcement of the cap bottom which is very favorable for the actuation of the electrical switch. The securing and arresting of the combination insert in the recess of the bow-type handle are not endangered according to the invention, despite the use of the soft component in this zone, because these parts of the combination which are inherently soft are supported by radial contact surfaces, axial shoulders and the like on the strong material of the bow-type handle at the desired locations. The formation of locking elements of the soft component is favorable for a precise plug-in assembly and fixation.

Figure 2:
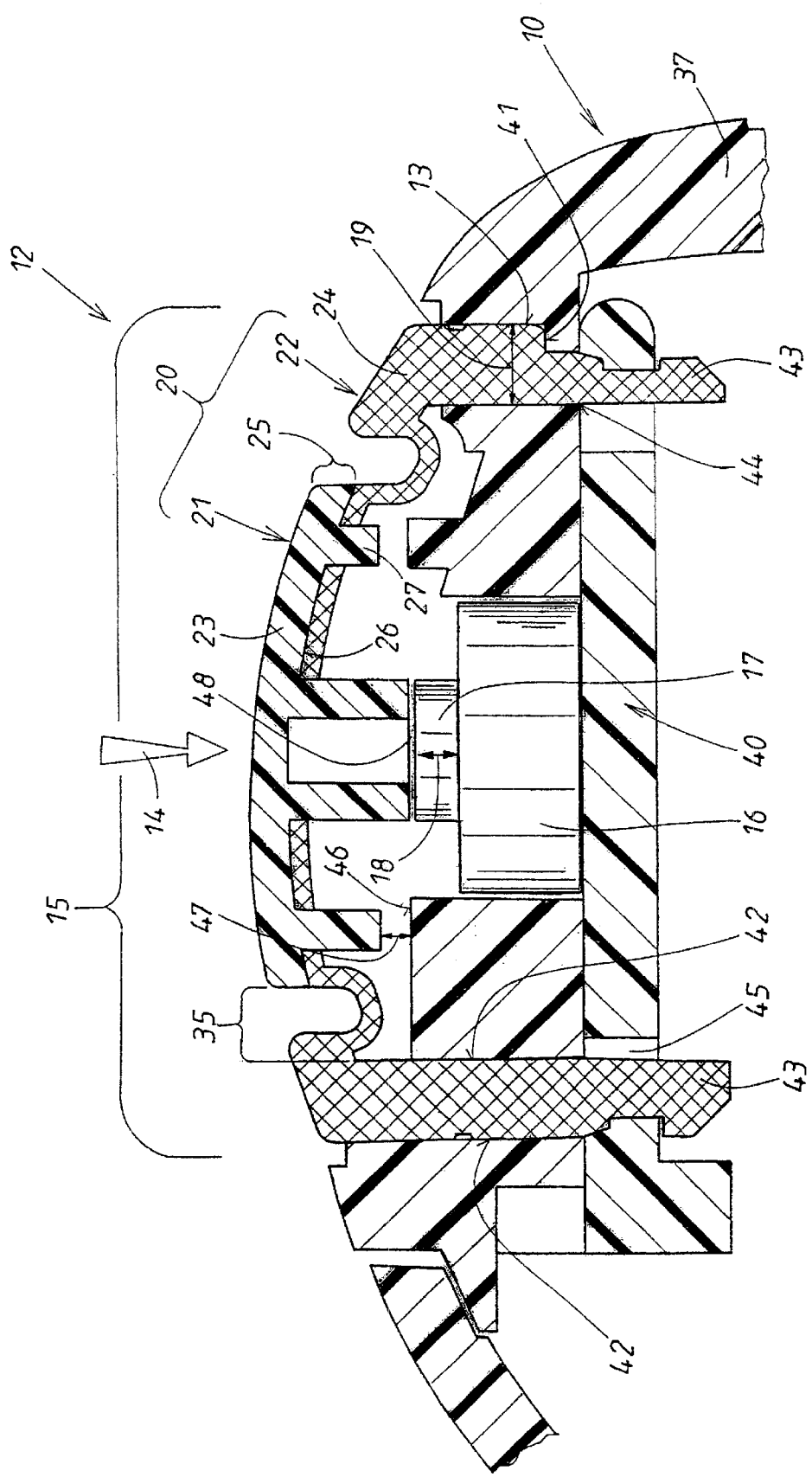
Figure 3:
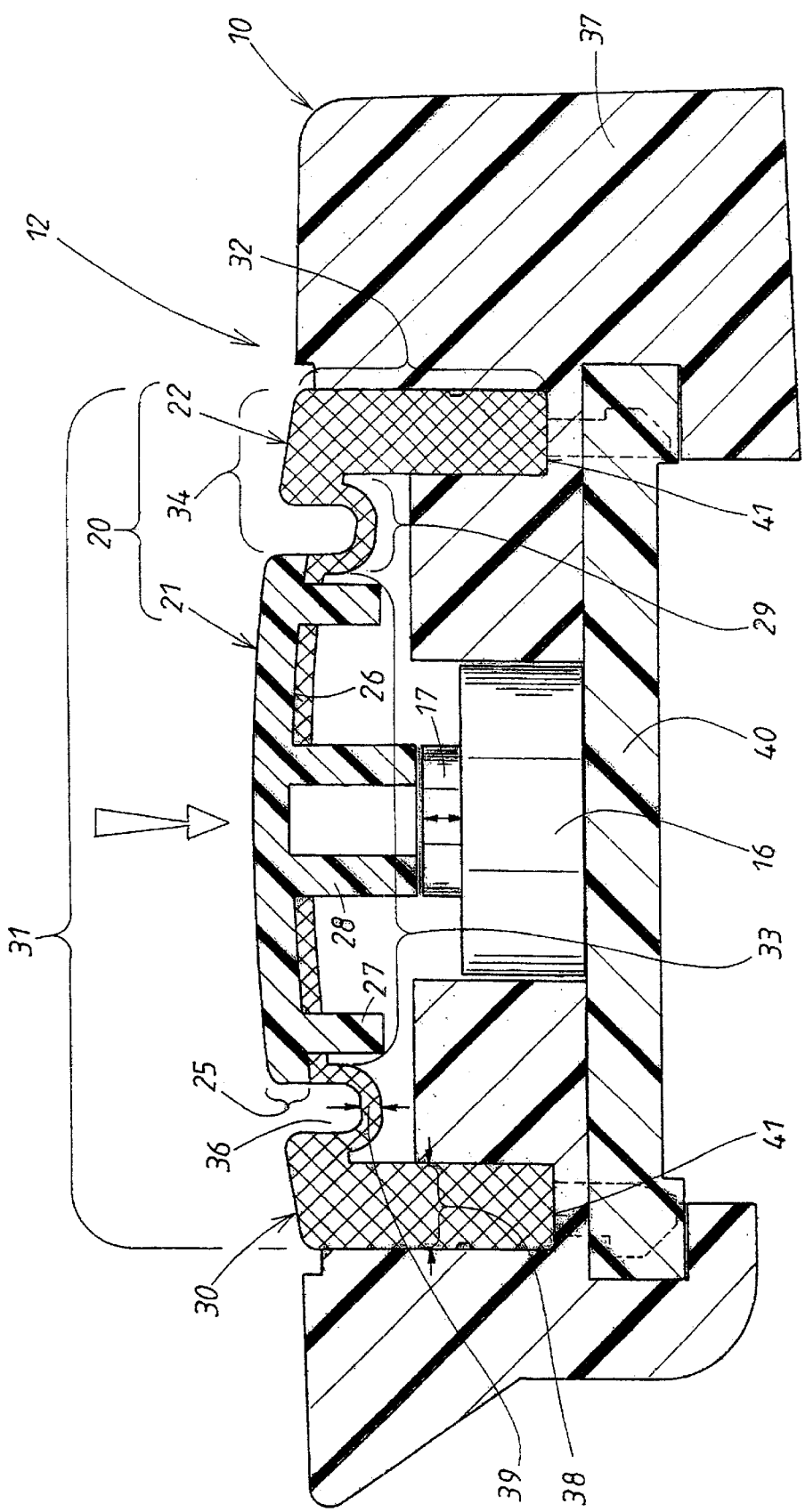

Further advantages of the invention result from the dependent claims, the following description, and the drawings. In the drawings, the invention is illustrated by means of one embodiment. It is shown in:

FIG. 1 a plan view onto the bow-type handle of a disassembled door handle,

FIG. 2 a cross-section, on a greatly enlarged scale, of the end area of the bow-type handle according to FIG. 1, viewed in the direction of the indicated section line II—II, and FIG. 3 in a representation analog to FIG. 2 a section of the same end of the bow-type handle in the direction of section line III—III of FIG. 1.

FIG. 1 shows only the disassembled bow-type handle 10 of the outer door grip which is designed for automobiles. It is a pull action door grip where one end 11 of the bow member is pivotably rotatably supported on a support of the door and its other bow member end 12 can be pulled out against a spring load. In this bow member end 12 a recess 13 is provided in which a push actuator 15 is arranged which acts on an electrical switch 16 arranged therein. The switch 16 has a push button 17 which is actuatable for triggering the electrical contacts in the direction of the double arrow 18. This is realized by a manual push actuation 15 in the direction of the illustrated arrow 14. According to the invention, this push actuator 15 is configured in a special way.

The push actuator 15 is a plug-in insert comprised of two different components 21, 22, which insert is referred to in the following as "combination insert" and which is identified by reference numeral 20. As already mentioned before, one component 21 is comprised of a hard, scratch-resistant plastic material 23 and will be referred to as the "hard component" of this combination insert 20. On the other hand, the other component 22 is formed of a soft, shape-elastic plastic material 24 and is therefore referred to as "soft component". This combination insert 20 has a special shape which will be explained with the aid of FIG. 3.

The combination insert 20 has a cap shape 30 which can be divided in principle into a cap bottom 31 and a cap mantle 32. The plan view of FIG. 1 shows that the cap bottom 31 has a rectangular contour when the rounded portions and curvatures are disregarded. While the cap mantle 32 is comprised exclusively of the soft component 22, the cap bottom 31 is of a very complex configuration. The central area 33 of the cap 30 is covered at its outer side with a plate of the hard component 21 which defines the push actuation location for the electrical switch. The inner surface 26 of this plate 25 is already covered with a layer of the soft component 22. The plate 25 is provided with elements 27, 28 at the edges and/or at the center which penetrate the wall layer of the soft component 22 arranged underneath. In this way, a positive-locking connection of the two components 21, 22 is realized as is illustrated clearly in FIG. 3. The elements 27 at the edge are stop elements which interact with corresponding shoulders 46, illustrated in FIG. 2, in the bow-type handle 10 when actuation 14 of the plate 25 occurs. These stops 27, 46 are coordinated with the central element 28. It is an actuator formed as a central shaft which is axially aligned with the push button 17 of the electrical switch 16. A gap 48, illustrated in FIG. 2, is present in the rest position between the shaft 28 and the upper end face of the push button 17. This gap 48 is smaller than the height spacing 47, also illustrated in FIG. 2, between the end face of the stop elements and the corresponding shoulder 46.

The edge zone of the cap bottom 31, shown in FIG. 3 and identified with 34, is already exclusively comprised of the soft component 22 and surrounds the plate 25 of the hard component 21 like a frame on all sides, as can be seen in FIG. 1. According to the axial section of FIG. 3, the transition area 35 between the contour of the plate 25 and the cap remainder 34, 32, formed of the soft component 22, has a bent profile 29 which in the present embodiment has a U-shape. In this way, an upwardly oriented open groove 36 is formed which surrounds the plate 35 annularly, as can be seen best in FIG. 1. This U-shaped profile 29 has a considerably reduced wall thickness 39 in comparison to the wall thickness 38 of the neighboring cap mantle 32. This bent profile 29 acts then as an especially elastically yielding pull-back spring which provides the defined initial position of the cap bottom 31 illustrated in FIG. 3.

The cap mantle 32 is comprised exclusively of the soft component 22 which is, however, enclosed by the special profiling of the recess 13 in the bow member end 12. The recess 13 is formed as an annular chamber whose chamber opening width 19, illustrated in FIG. 2, is matched to the aforementioned mantle thickness 38 of the cap mantle 32. The soft component 32 provided there is seated by pressfit in the annular chamber 13. The chamber 13 illustrated in FIG. 2 has thus in the bow member material 37 defined radial contact surfaces 42 as well as axial shoulders 41 for the soft cap mantle 32.

On the cap mantle 32 locking elements are provided, which, as shown in FIG. 2, are comprised of radially springy hooks 43. At the base of the annular chamber 13 a penetration 44 is provided from which the hooks 43 of the mounted cap 30 project axially and are anchored in a locking plate 40. The locking plate 40 is positioned areally on the backside cutout of the oppositely positioned side of the annular chamber 13 and comprises holes 45 correlated with and complementary to the hooks 43. They allow during coupling the radially elastic deflection movement of the hooks 43. The hook head engages behind the edge of the hole. With the aforementioned axial shoulders 41, on the one hand, and the snap-in hooks 43, on the other hand, the combination insert 20 is secured positive-lockingly in the chamber 13. This secures the position of the locking plate 40. The locking plate 40 is a support for the electrical switch 16 which is glued onto the outwardly positioned plate side. The locking plate 40 can be secured at its edge, as illustrated in FIG. 3, positive-lockingly in corresponding recesses of the bow member material 37, and this is the case before as well as during and after assembly of the insert 15 in the bow-type handle.

List of Reference Numerals 10 bow-type handle
11 first bow member end of 10
12 second bow member end of 10
13 recess in 12, annular chamber
14 push actuation arrow of 15
15 push actuator in 12
16 electrical switch
17 pushbutton of 16
18 double arrow of the button movement of 17
19 radial opening width of 13
20 combination insert for 15
21 first component of 20, hard component
22 second component of 20, soft component
23 hard, scratch-resistant plastic material for 21
24 form-stable, soft plastic material for 22
25 plate of 21
26 inner surface of 25
27 stop element, edge-side element on 25 (FIG. 3)
28 actuation element for 17, central shaft of 25 (FIG. 3)
29 bent profile of 35, u-profile
30 cap shape of 20
31 cap bottom of 30
32 cap mantle of 30 made of 22
33 central area of 31
34 edge zone of 31
35 transition area between 25, 32
36 groove of 29 (FIG. 3)
37 bow member material of 10
38 mantle thickness of 32
39 wall thickness of 22
40 locking plate
41 axial shoulder for 32 in 13
42 contact surface for 32 in 13
43 locking element (radially springy hook)
44 penetration in the base of 13
45 hole in 40 for 43
46 shoulder on 10
47 height spacing between 17 and 46
48 gap between 28 and 17

What is claimed is:

1. Outer door handle for vehicles, comprising;

a bow-type handle (10);

a recess (13) at an end of the bow-type handle (10);

a push actuator (15) of an electrical switch (16) having a shape of a cap (30) and inserted into the recess (13);

wherein the push actuator (15) is a composite plug-in insert comprised of a first component (21) and a second component (22) and forms a combination insert (20);

wherein the cap (30) is comprised of a cap bottom (31) and a cap mantle (32) connected to the cap bottom (32);

wherein the first component (21) of the combination insert (20) is a plate (25) of substantially hard, scratch-resistant plastic material and forms a hard component (21) of the combination insert (20);

wherein the second component of the combination insert (20) is comprised of a substantially soft, shape-elastic plastic material and forms a soft component (22) of the combination insert (20);

wherein the cap mantle (32) consists exclusively of the soft component (22) and wherein the cap bottom (31) is comprised of the soft component and the hard component;

wherein the soft component extends across an entire cap bottom area delimited by the cap mantle (32);

wherein the hard component (21) is arranged in a central area (33) of the cap bottom on an outer side of the cap bottom facing away from the cap mantle (32) and leaves an edge zone (34) of the soft component uncovered such that the edge zone (34) surrounds the hard component, wherein the hard component (21) forms an outwardly directed push actuation location in the bow-type handle (10);

wherein the cap mantle (32) is provided with radial contact surfaces (42), axial shoulders (41), and locking elements (43) configured to support and secure the combination insert (20) in the recess (13) of the bow-type handle (10).

2. Door handle according to claim 1, wherein the soft component (22) at the transition (35) between the contour of the plate (25) and the cap remainder (32, 34) has a wall thickness (39) smaller than a wall thickness in a remaining area (38) of the cap mantle (32) that is not covered.

3. Door handle according to claim 1, wherein the recess (13) is comprised of an annular chamber having a chamber opening width (19) matched to a mantle thickness (38) of the cap mantle such that the soft component (22) provided thereat is received at least at portions thereof by pressfit.

4. Door handle according to claim 1, wherein the locking element (43) provided on the cap mantle (32) is a radially springy hook formed of the soft component (22), wherein the springy hook has a hook shaft, penetrating a perforation (44) provided at a bottom of the recess (13) in an assembled state, and a hook head anchored in a locking plate (40).

5. Door handle according to claim 4, wherein the locking plate (40) is arranged behind the bottom of the recess (13) in an insertion direction of the springy hook and the locking plate (40) is provided with holes (45) penetrated by the hook shaft in the assembled state such that the hook head engages a hole edge of the holes (45).

6. Door handle according to claim 4, wherein the locking plate (40) is a support for a microswitch (16) having a switch button (17) engaging underneath the outer cap bottom (31).

7. Door handle according to claim 6, wherein the actuation elements (28) of the hard component (21) of the plate (25) penetrate the soft component (22) and are aligned with the switch button (17) of the microswitch (16).

8. Door handle according to claim 6, wherein stop elements (27) of the hard component (21) of the plate (25) penetrate the soft component (22) and interact with shoulders (46) of the bow-type handle (10) upon actuation (14) of the push actuator (15) and limit a pushed-in position.

* * * * *